United States Patent
Adams-Campos et al.

(10) Patent No.: US 10,773,635 B1
(45) Date of Patent: Sep. 15, 2020

(54) SYSTEMS AND METHODS FOR CONTROLLING VEHICLE LIGHTS

(71) Applicant: Ford Global Technologies, LLC, Dearborn, MI (US)

(72) Inventors: Mario Alejandro Adams-Campos, Ferndale, MI (US); Elias Ruiz, Atizapan (MX); Gregory S. Hawkins, Ypsilanti, MI (US); Kelley Maria Adams-Campos, Ferndale, MI (US); Alejandro Becerra, Cuautitlan Izcalli (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/712,811

(22) Filed: Dec. 12, 2019

(51) Int. Cl.
*B60Q 1/14* (2006.01)
*B60Q 1/04* (2006.01)
*B60Q 1/00* (2006.01)
*B60Q 1/24* (2006.01)
*B60Q 1/34* (2006.01)

(52) U.S. Cl.
CPC ............ *B60Q 1/04* (2013.01); *B60Q 1/0076* (2013.01); *B60Q 1/24* (2013.01); *B60Q 1/346* (2013.01); *B60Q 2300/42* (2013.01); *B60Q 2300/45* (2013.01)

(58) Field of Classification Search
CPC ............ B60Q 2300/40; B60Q 2300/42; B60Q 2300/45; B60Q 1/346
See application file for complete search history.

(56) References Cited

U.S. PATENT DOCUMENTS

| 2005/0200467 A1* | 9/2005 | Au ............................ B60Q 1/40 340/465 |
| 2018/0093604 A1* | 4/2018 | George .................. B60Q 1/143 |
| 2018/0319324 A1* | 11/2018 | Liu .......................... B60Q 1/26 |

* cited by examiner

*Primary Examiner* — Thuy Vinh Tran
(74) *Attorney, Agent, or Firm* — Frank Lollo; Eversheds Sutherland (US) LLP

(57) ABSTRACT

This disclosure is directed to systems and methods for automatically controlling various lights of a vehicle. The systems and methods are configured to determine whether a vehicle is being driven off-road or on a public road, determine a first light activation condition that is based on whether the vehicle is being driven off-road or on the public road, and execute a vehicle lights control procedure to grant to a driver of the vehicle on-off control of a first light in the vehicle based on the first light activation condition and to withdraw grant of the on-off control of the first light based on a second light activation condition.

20 Claims, 5 Drawing Sheets

SYSTEMS AND METHODS FOR CONTROLLING VEHICLE LIGHTS

FIELD OF THE DISCLOSURE

This disclosure generally relates to operations associated with a vehicle, and more particularly relates to using a computer to automatically control lights of a vehicle in accordance with various light activation conditions.

BACKGROUND

Vehicle manufacturers typically manufacture various types of vehicles that may appeal to various segments of the market. For example, a vehicle manufacturer may manufacture a sedan that appeals to a first segment of the market, a van that appeals to a second set of the market, and a sports utility vehicle that appeals to a third segment of the market. Most of these vehicles are sold with a set of accessories that are built into the vehicle during manufacture, and some others that are offered as optional accessories for purchase by a buyer if so desired. For example, most vehicles typically include an audio system of some kind, such as an infotainment system that includes a radio, a CD player, and a universal serial bus (USB) interface coupled to an audio amplifier. The infotainment system may be built into the vehicle during manufacture, and the purchase price of the vehicle typically includes a cost of the infotainment system.

In another example, a vehicle dealership may offer a buyer an option to purchase a set of customized wheels in place of the factory-installed wheels. Some customers, particularly customers who would like to purchase a sports utility vehicle for off-road use, may opt to purchase the customized wheels as well as other optional accessories such as additional lights for off-road use.

The vehicle dealership may agree to install the additional lights in accordance with certain rules and guidelines that the dealership deems appropriate. For example, the dealership may agree to install fog lights in a sports utility vehicle, recognizing that such installation does not violate state or local laws. However, the dealership may balk at installing an array of high-powered lights upon the hood of a sports utility vehicle because the use of such a high-intensity light source on a public highway may cause problems to drivers of other vehicles. The buyer may then decide to have the light assembly installed on the vehicle by an independent installer after purchasing the vehicle. In at least some cases, the buyer and the installer may be unaware of, or choose to ignore, rules and regulations that prohibit or regulate the installation and use of such high-intensity light assemblies.

Furthermore, a first set of rules and regulations that may be applicable to the use of accessory lights of a vehicle in a first country or region, may not be applicable, or may be different than, a second set of rules and regulations that are applicable in a second country or region. Consequently, it may be difficult for a driver of a vehicle to use an accessory light (such as the high-powered light array) in accordance with applicable rules and regulations when driving through the first country and the second country.

It is therefore desirable to address at least some of the issues described above, and more particularly to address existing issues with respect to the use of accessory lights in a vehicle.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
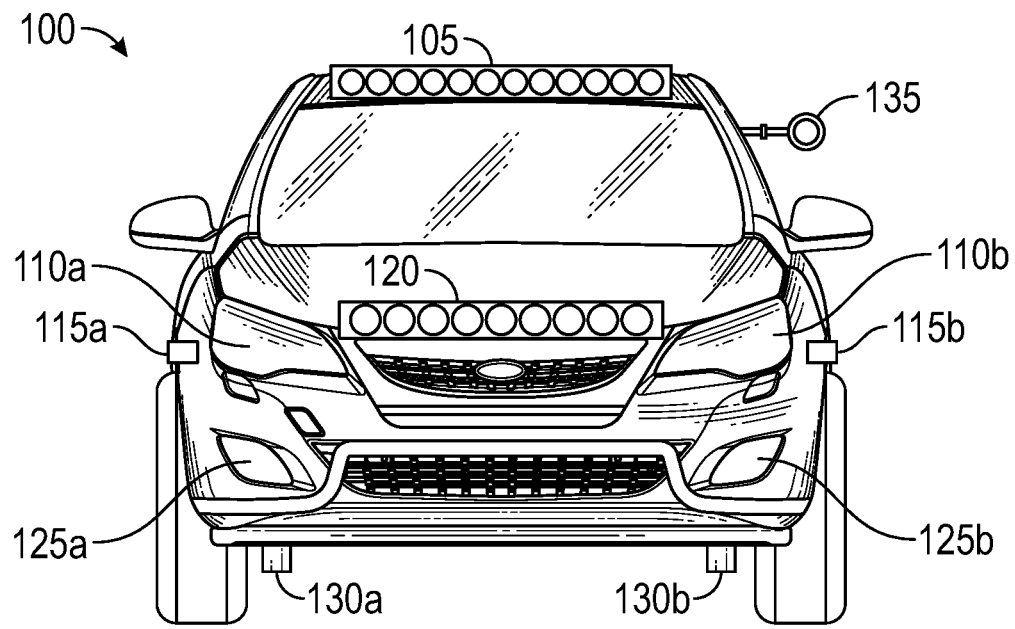
FIG. 1 shows a front view of an exemplary vehicle that includes various types of lights.

In terms of a general overview, certain embodiments described in this disclosure are directed to systems and methods for using a computer to automatically control various lights of a vehicle that may be driven on a public road and also driven off-road. The vehicle may include various accessory lights such as, for example, a light bar containing an array of high-intensity light components mounted upon a roof of the vehicle and/or a floodlight mounted upon a pillar of the vehicle. The illumination provided by such accessory lights may be very useful when the vehicle is being driven off-road. However, using these types of lights on a two-way public highway, for example, may violate laws and ordinances applicable to vehicles driven on the two-way public highway. Consequently, in accordance with the disclosure, a vehicle lights controller may process data received from one or more of various sources such as, for example, a global positioning system (GPS), a server computer, a database, a sensor system or an image capture device in order to determine whether the vehicle is being driven off-road or on a public road. If the vehicle is being driven on a public road, the vehicle lights controller may automatically deny the driver of the vehicle on-off control of the light bar or may place a limitation upon the intensity of light emitted by the light bar.

Illustrative Embodiments

The disclosure will be described more fully hereinafter with reference to the accompanying drawings, in which exemplary embodiments of the disclosure are shown. This disclosure may, however, be embodied in many different forms and should not be construed as limited to the exemplary embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described exemplary embodiments but should be defined only in accordance with the following claims and their equivalents. The description below has been presented for the purposes of illustration and is not intended to be exhaustive or to be limited to the precise form disclosed. It should be understood that alternative implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, words such as "vehicle," "automobile," "vehicular," and "automotive" as used herein generally pertain to various types of motor vehicles such as for example, a car, a truck, a van, a sport utility vehicle (SUV), and a crossover vehicle. The word "controller" as used herein, generally refers to a computer and/or various kinds of devices that can be used to control the operation of various types of objects in a vehicle such as switches, relays, and lights. The phrase "off-road" area may be a part of a public land (a state park or a federal park, for example) or can be privately owned with limited access to the public. The phrase "public road" as used herein generally refers to a road that is provided for use by the general public (an interstate highway, a state highway, or a county road, for example), and is typically under the jurisdiction of a public authority (federal government, state government, or city government agency, for example). The public road may be maintained by the public authority or contractors hired by the public authority and may be paved or unpaved. Furthermore, it should be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

Figure 2:
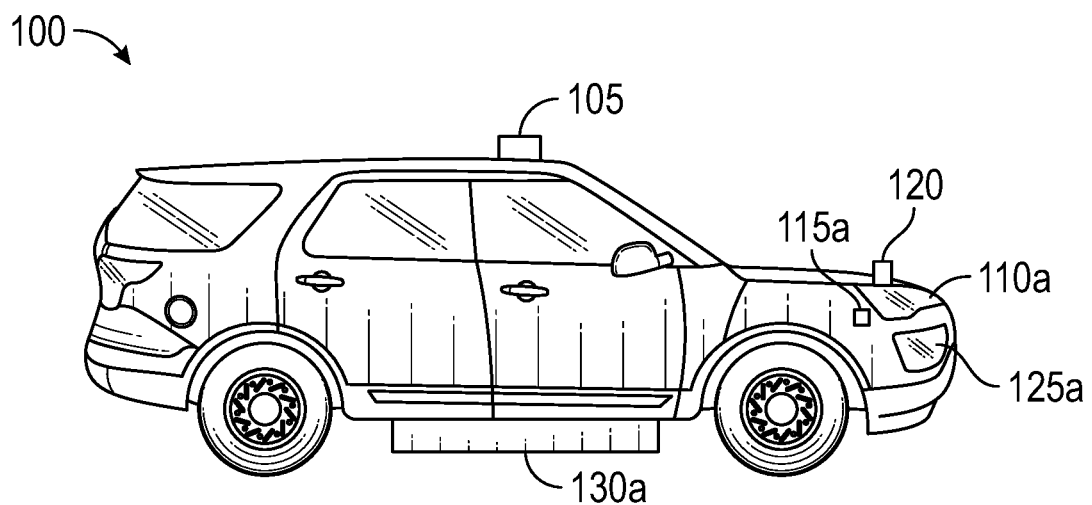
FIG. 2 shows a side view of the exemplary vehicle illustrated in FIG. 1.

FIG. 1 shows a front view of an exemplary vehicle 100 that includes various types of lights. FIG. 2 shows a side view of the vehicle 100. The vehicle 100 may be any vehicle such as a gasoline-powered vehicle, an electric vehicle, a hybrid electric vehicle, or an autonomous vehicle, and may include some lights that are factory-installed, some that are aftermarket lights installed by a dealership, and some others that are aftermarket lights installed by an entity such as a vehicle owner, a hired installer, an automotive workshop, or an auto store that sells automotive accessories. Lights that are factory-installed may include, for example, a headlight 110a, a headlight 110b, a right turn indicator light 115a, and a left turn indicator light 115b. After-market lights installed by a dealership may include, for example, a fog light 125a and a fog light 125b. After-market lights installed by other entities may include, for example, a light bar 105 mounted on the roof of the vehicle 100, a light bar 120 that is mounted on a hood of the vehicle 100, an undercarriage light 130a, an undercarriage light 130b, and a floodlight 135.

The factory-installed lights may typically conform to various standards such as, for example, Federal Motor Vehicle Safety Standard 108 (FMVSS 108) that regulates automotive lighting, signaling and reflective devices in the United States, and Canada's version that is generally known as Canada Motor Vehicle Safety Standard 108 (CMVSS 108). The factory-installed lights may also conform to certain regulations and ordinances enacted by some government agencies such as a city traffic department, a city police department, a city governing body, or a municipality. The regulations and ordinances may stipulate that the headlights of a vehicle must be turned on when streetlights are turned on, or when the wipers of the vehicle are turned on. The factory-installed lights may conform to such regulations and ordinances when the vehicle includes sensing and controlling mechanisms that automatically turn on the headlights when darkness falls or when the wipers are turned on.

The after-market lights installed by a dealership or an entity such as an owner of the vehicle 100, may or may not conform to such standards, regulations and/or ordinances. In one example scenario, a dealership may be anxious to sell the vehicle 100 to a customer and may agree to install an accessory light, such as the floodlight 135, regardless of conformance to standards and/or regulations.

In another example scenario, a reputed dealership in a country such as the United States, may ensure that the mounting of the fog light 125a and the fog light 125b upon the vehicle 100 conforms to guidelines provided by a manufacturer of the vehicle 100 and also that the type of bulbs used in the fog light 125a and the fog light 125b conform to industry standards. In some cases, the manufacturer may provide pre-cut holes in a bumper of the vehicle 100, to allow the dealership to install the fog light 125a and the fog light 125b on the vehicle 100. When doing so, the manufacturer may have ensured that the location of the pre-cut holes conforms to applicable standards and regulations.

In yet another example scenario, the vehicle 100 may be a sports utility vehicle and a driver of the sports utility vehicle may like to go off-roading. The off-road travel may involve driving over rough terrain at night. The factory-installed lights may be inadequate to do so. Consequently, the driver may decide to purchase the light bar 105 and/or the light bar 120 online from a seller located in a foreign country. The light bar 105 and/or the light bar 120 sold by the online seller may incorporate a set of gas-discharge lights and a focusing lens for producing a very high-intensity light beam that offers the driver of the vehicle 100 long-distance visibility when driving off-road. The driver has to make a conscious effort to turn off the light bar 105 and/or the light bar 120 when driving on a public road or may place a cover upon the light bar 105 (as may be mandated by certain laws), so as to avoid inconveniencing drivers traveling in the opposite direction. A considerate driver may do so. However, an inconsiderate or careless driver may either forget to turn off the light bar 105 and/or the light bar 120 or may opt to leave them on irrespective of the inconvenience and risk caused to other drivers.

Figure 3:
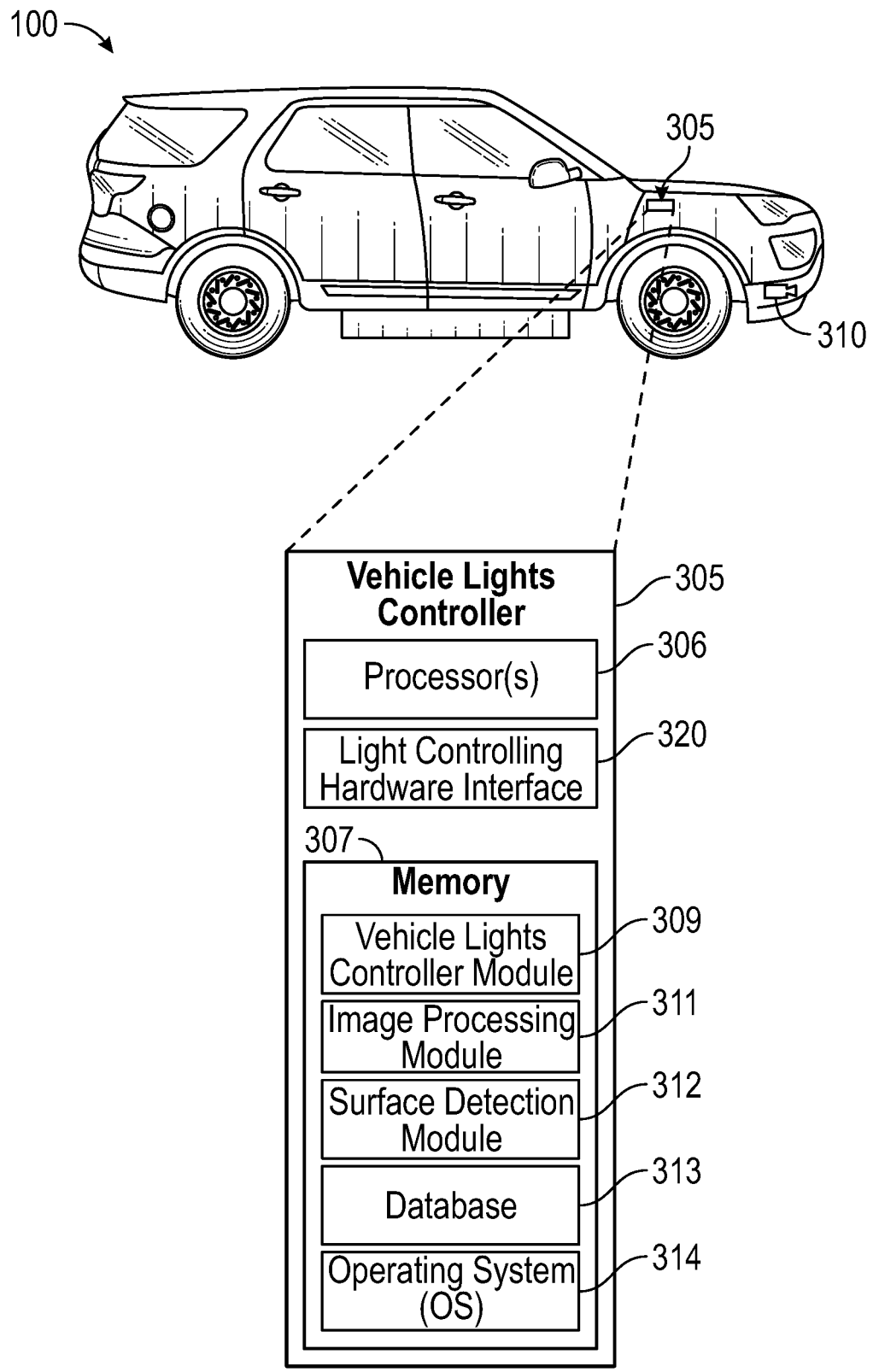
FIG. 3 shows some exemplary components of a vehicle lights controller that controls various lights of a vehicle in accordance with an embodiment of the disclosure.

FIG. 3 shows some exemplary components of a vehicle lights controller 305 that controls various lights of the vehicle 100 in accordance with an embodiment of the disclosure. The vehicle lights controller 305 may include a processor 306, a light controlling hardware interface 320, and a memory 307. The light controlling hardware interface 320 may include hardware that allows the vehicle lights controller 305 to interact with sensors, actuators, and other components for controlling various lights in the vehicle 100.

In one exemplary embodiment in accordance with the disclosure, the light controlling hardware interface 320 may include circuitry for receiving an image file or a video clip from an exemplary camera 310, which can be mounted on a bumper, a grille, or a chassis of the vehicle 100. The camera 310 can be one of various types of image capture devices such as a digital camera, a video camera, or an infrared camera (for capturing images in low intensity environments) and can be used for capturing images of various types of objects on, or near, a road upon which the vehicle 100 is being driven. In one case, the camera 310 may capture an image of a road sign or a highway identification label when the vehicle 100 is being driven upon a public road. In another case, the camera 310 may capture an image of objects (trees, rocks, etc.) that may provide an indication that the vehicle 100 is being driven off-road.

The camera 310 can be one component of a driving surface detection system that may include image capture devices as well as sensors for identifying a type of surface or a type of terrain upon which the vehicle 100 is being driven. Some exemplary sensors may include a vibration sensor and a pressure sensor. The vibration sensor may be used to detect vibration in the chassis of the vehicle 100 and to provide vibration data to the vehicle lights controller 305. The vehicle lights controller 305 may process the vibration data to determine whether the vehicle 100 is being driven off-road or on a paved public road. The pressure sensor may be coupled to a shock absorber of the vehicle 100 to detect a level of activation of the shock absorber when the vehicle 100 is being driven upon a surface. Data provided by the pressure sensor(s) may be processed by the vehicle lights controller 305 to determine whether the vehicle 100 is being driven off-road or on a paved road.

A gear-shift system of the vehicle 100 may also be used to provide to the vehicle lights controller 305, information that may be used to determine whether the vehicle 100 is being driven off-road or on a public road. For example, the vehicle lights controller 305 may determine that the vehicle 100 is being driven off-road upon receiving information from the gear-shift system that a low gear has been engaged and has been in use over a period of time. Engagement of a high gear or an overdrive system may provide to the vehicle lights controller 305, an indication that the vehicle is being driven on a public road.

The memory 307, which is one example of a non-transitory computer-readable medium, may be used to store an operating system (OS) 314, a database 313, and various code modules such as a vehicle lights controller module 309, an image processing module 311, and a surface detection module 312. The code modules are provided in the form of computer-executable instructions that can be executed by the processor 306 for performing various operations in accordance with the disclosure. For example, the vehicle lights controller module 309 can be executed by the processor 306 for performing various light controlling operations in accordance with the disclosure. The operations are generally directed at enabling and/or disabling operation of various lights in the vehicle 100.

In one exemplary embodiment, the vehicle lights controller module 309 may interact with the light controlling hardware interface 320 to obtain information such as, for example, location information from a GPS, sensor data from various sensors, location information from a server computer, and/or image data from the camera 310 in order to determine whether the vehicle 100 is being driven on a public road or off-road. The processor 306 may execute the image processing module 311 for processing image data received from the camera 310 in order to identify whether the vehicle 100 is being driven on a public road or off-road. The processor 306 may execute the surface detection module 312 to determine whether the vehicle 100 is being driven off-road or on a paved road. The determination may include processing data obtained from sensors such as the vibration sensor and the pressure sensor described above.

The database 313 may be used to store various types of data that can be used by the vehicle lights controller module 309. For example, the database 313 may be used to store various rules, regulations, and ordinances pertaining to light activation conditions and limitations that may be applicable to the use of vehicle lights when the vehicle 100 is driven on various defined road types. Some exemplary agencies that may provide the various rules, regulations, and ordinances can include a standards body, a government agency, or a law enforcement agency.

In some embodiments, the database 313 may be populated with data wirelessly fetched by the vehicle light controller 305 from a server computer (not shown) operated from a remote location outside the vehicle 100.

Figure 4:
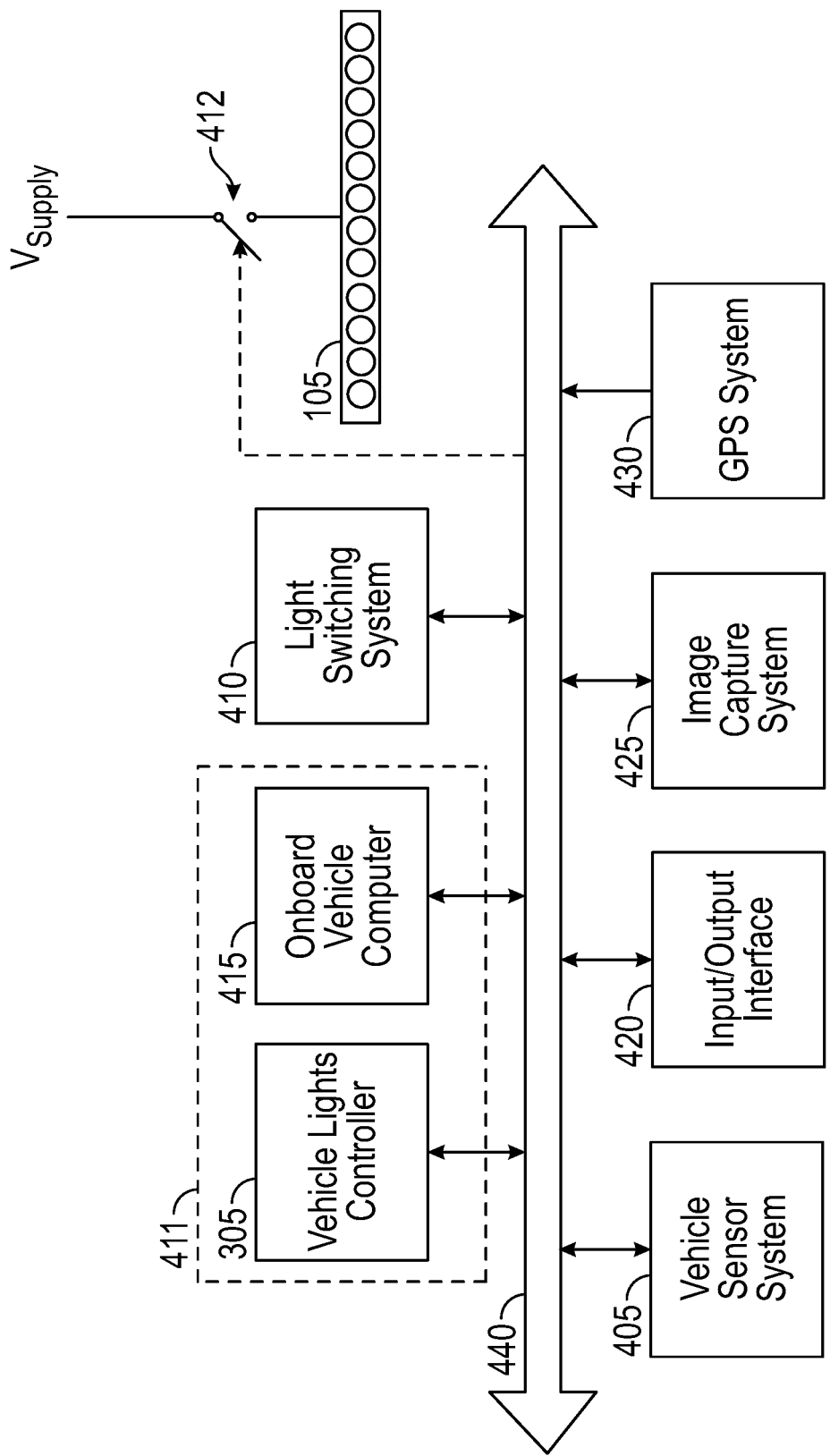
FIG. 4 shows some exemplary components that may be provided in a vehicle in accordance with an embodiment of the disclosure.

FIG. 4 shows some exemplary components that may be provided in the vehicle 100 in accordance with an embodiment of the disclosure. The exemplary components may include the vehicle lights controller 305, an onboard vehicle computer 415, a vehicle sensor system 405, a light switching system 410, an input/output interface 420, an image capture system 425, and a GPS 430. The various components are communicatively coupled to each other via one or more buses, such as a bus 440 that can be implemented using various wired and/or wireless technologies. For example, the bus 440 can be a vehicle bus that uses a controller area network (CAN) bus protocol, a Media Oriented Systems Transport (MOST) bus protocol, and/or a CAN flexible data (CAN-FD) bus protocol. Some or all portions of the bus 440 may also be implemented using wireless technologies such as Bluetooth®, Ultra-Wideband, Wi-Fi, Zigbee®, or near-field-communications (NFC). For example, the bus 440 may include a Bluetooth® communication link that allows the vehicle lights controller 305 to wirelessly communicate with the image capture system 425 and the onboard.

In one exemplary implementation, the vehicle lights controller 305 is an independent standalone unit. In another exemplary implementation, some or all components of the vehicle lights controller 305 may be incorporated into the onboard vehicle computer 415 as indicated by the dashed line box 411. The onboard vehicle computer 415 may perform various functions such as controlling engine operations (fuel injection, speed control, emissions control, braking, etc.), managing climate controls (air conditioning, heating etc.), activating airbags, and issuing warnings (check engine light, bulb failure, low tire pressure, vehicle in blind spot, etc.).

The light switching system 410 may include various switches and/or actuators that are connected to various lights of the vehicle such as, for example, the fog lights, the headlights, and the light bar 105 mounted on the roof of the vehicle 100. Illustrated in FIG. 4 is an exemplary switch 412 that is operable to couple power into the light bar 105. Power is coupled into the light bar 105 when the switch 412 is in an "on" condition and is disconnected from the light bar 105 when the switch 412 is in an "off" condition. The switch 412 may be manually activated by a driver of the vehicle 100 in some situations. However, the vehicle lights controller 305 has an override control of the activation of the switch 412 such as, when the vehicle lights controller 305 identifies a driving condition during which the light bar 105 should not be turned on.

In an exemplary scenario, the vehicle lights controller 305 may determine that the vehicle 100 is being driven off-road and may enable activation of the switch 412 by the driver of the vehicle so as to permit the driver of the vehicle 100 to turn on the light bar 105. At a different time, the vehicle lights controller 305 may determine that the vehicle 100 is being driven on the public highway and may disable the light bar 105 because turning on the light bar 105 may violate a federal regulation or a city ordinance when the vehicle 100 is being driven on a public highway. The driver would then be unable to turn on the light bar 105 even if he/she wanted to do so because the vehicle lights controller 305 has an override control that supersedes any action taken by the driver to turn on the light bar 105.

In one exemplary implementation, the vehicle lights controller 305 may disable the light bar 105 by transmitting a control signal to the switch 412 via the bus 440. In another exemplary implementation, the switch 412 may be a dimmer switch and the vehicle lights controller 305 may control the dimmer switch to limit an amount of power provided to the light bar 105. The vehicle lights controller 305 can thus enforce a limitation upon the intensity of light emitted by the light bar 105 when the vehicle 100 is driven on a public road. Consequently, even if on-off control of the switch 412 were to be provided to the driver of the vehicle 100, the intensity of light emitted by the light bar 105 may render the light bar 105 allowable for use on a public road.

The switch 412 may be provided in various forms in accordance with the disclosure. In one example embodiment, the switch 412 may be a soft switch displayed for example, in the form of a clickable icon on a graphical user interface (GUI) of the input/output interface 420. The GUI is one example of a human-machine-interface (HMI) that may be used to implement one or more embodiments in accordance with the disclosure. In one exemplary implementation of the embodiment shown in FIG. 4, the soft switch may be displayed upon the GUI when the vehicle lights controller 305 has determined that the vehicle 100 is being driven off-road, and may be eliminated from the GUI when the vehicle lights controller 305 has determined that the vehicle 100 is being driven on a public road. In another example implementation of the embodiment shown in FIG. 4, the switch 412 may be a mechanical switch, such as a toggle switch that is mounted on an instrument panel of the vehicle 100. Operating of the toggle switch by the driver has no effect upon the light bar 105 when the vehicle lights controller 305 has executed the overriding action.

The vehicle sensor system 405 can include various sensors such as, for example, the vibration sensor and the pressure sensor described above. Sensor data obtained by the sensors may be propagated to the vehicle lights controller 305 via the bus 440.

The image capture system 425 may include image capture devices such as the camera 310 described above. The vehicle lights controller 305 may transmit command signals over the bus 440 to configure the image capture system 425 to capture images of a surface upon which the vehicle 100 is being driven. Images captured by the image capture system 425 may be propagated to the vehicle lights controller 305 via the bus 440. The image processing module 311 in the vehicle lights controller 305 may be used to determine whether the vehicle 100 is being driven off-road or on a public road.

Figure 5:
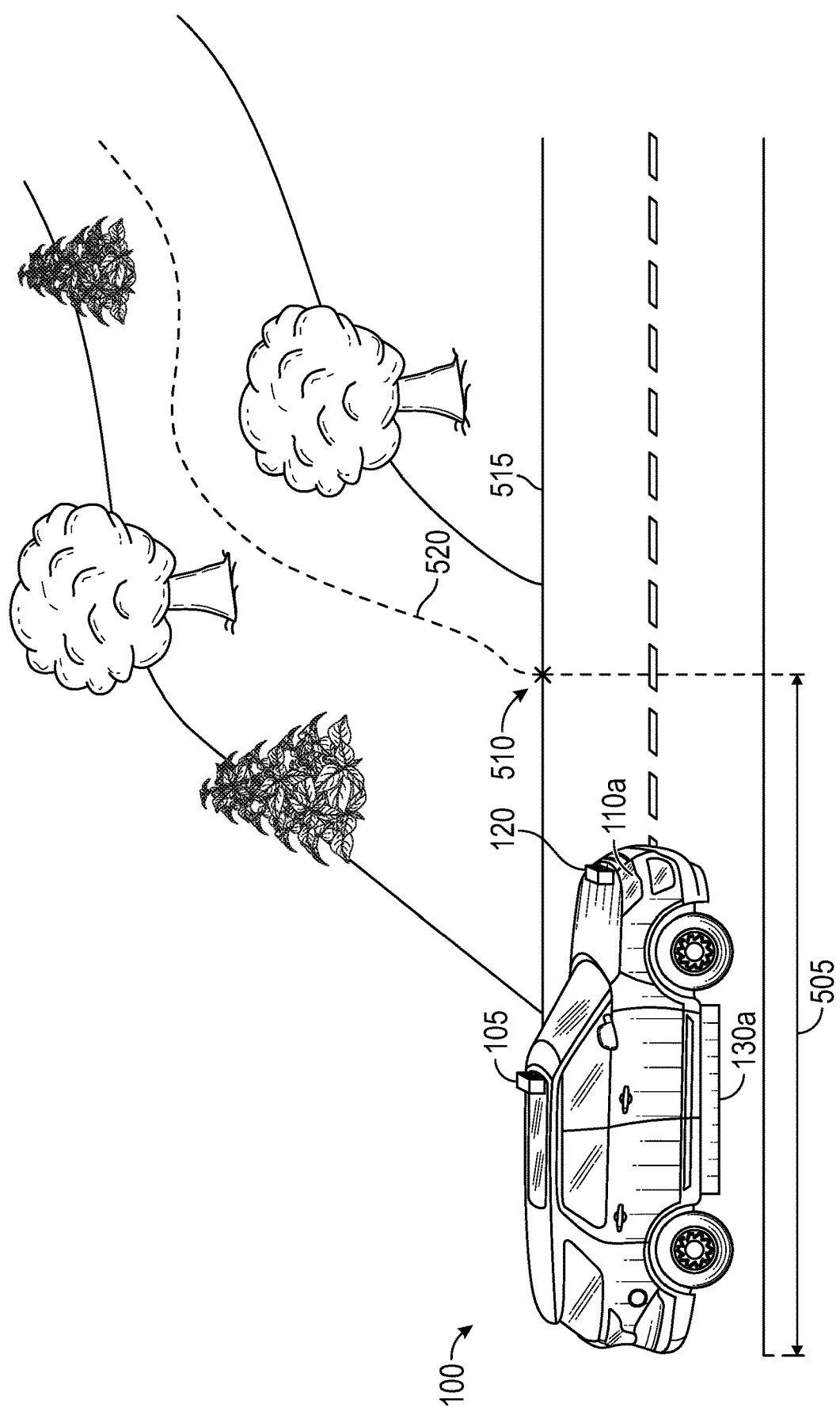
FIG. 5 shows an exemplary scenario where a vehicle lights controller is used to control various lights of a vehicle in accordance with the disclosure.

FIG. 5 shows an exemplary scenario where the vehicle lights controller 305 is used to control various lights of the vehicle 100 in accordance with the disclosure. The vehicle 100 travels on a public road 515 over a distance 505. The distance 505 may, for example, equal 50 miles and the vehicle 100 may take an hour to traverse the distance 505.

The vehicle lights controller 305 may grant to the driver, on-off control of some of the lights in the vehicle 100 and deny on-off control of some other lights in the vehicle 100. Granting or denying such on-off control may be based on various factors such as, for example, the distance 505 over which the vehicle 100 is driven on the public road 515 and/or a duration of time over which the vehicle 100 is driven on the public road 515.

The vehicle lights controller 305 may use data obtained from the GPS 430, one or more sensors of the vehicle sensor system 405, and/or an image captured by the image capture system 425 to determine that the vehicle 100 is being driven on the public road 515. The vehicle lights controller 305 determines one or more light activation conditions that may apply when the vehicle 100 is being driven on the paved road 515. In one exemplary case, the vehicle lights controller 305 may refer to data stored in the database 313 to make the determination. The database 313 may include, for example, a county law that prohibits the use of certain accessory lights on the public road 515 (such as the light bar 105 and the light bar 120), but may, however, not prohibit the use of some other accessory lights on the public road 515 (such as the undercarriage light 130a and the undercarriage light 130b). The county law may further stipulate that the headlights of the vehicle 100 should be turned on at all times when ambient light conditions warrant and when the vehicle 100 is being driven on the public road 515. The vehicle lights controller 305 may use the stipulations provided in the county law to grant to a driver of the vehicle 100, on-off control of the undercarriage light 130a and the undercarriage light 130b, but deny on-off control of the headlights, the light bar 105, and the light bar 120.

The vehicle 100 may be driven off the public road 515 at a location 510 and may then be driven off-road along the path 520. The vehicle lights controller 305 may use data obtained from one or more sensors of the vehicle sensor system 405 and/or another image captured by the image capture system 425 to detect that the vehicle 100 is being driven off-road. The vehicle lights controller 305 may then determine one or more light activation conditions that may be applicable when the vehicle 100 is being driven off-road. In one exemplary case, the vehicle lights controller 305 may refer to data stored in the database 313 to make the determination.

The database 313 may indicate that the county law that prohibits the use of certain types of lights when a vehicle 100 is being driven on the public road 515 does not apply when the vehicle 100 is being driven off-road. The vehicle lights controller 305 may use the stipulations provided in the county law to grant on-off control of all the lights in the vehicle 100 to the driver of the vehicle 100. The driver can turn on the light bar 105 and/or the light bar 120 to obtain higher illumination and better visibility of the rough terrain along the path 520. In some cases, the vehicle lights controller 305 may determine that one or more lights should not be turned on when the vehicle 100 is being driven off-road and may deny the driver, on-off control of such lights.

Figure 6:
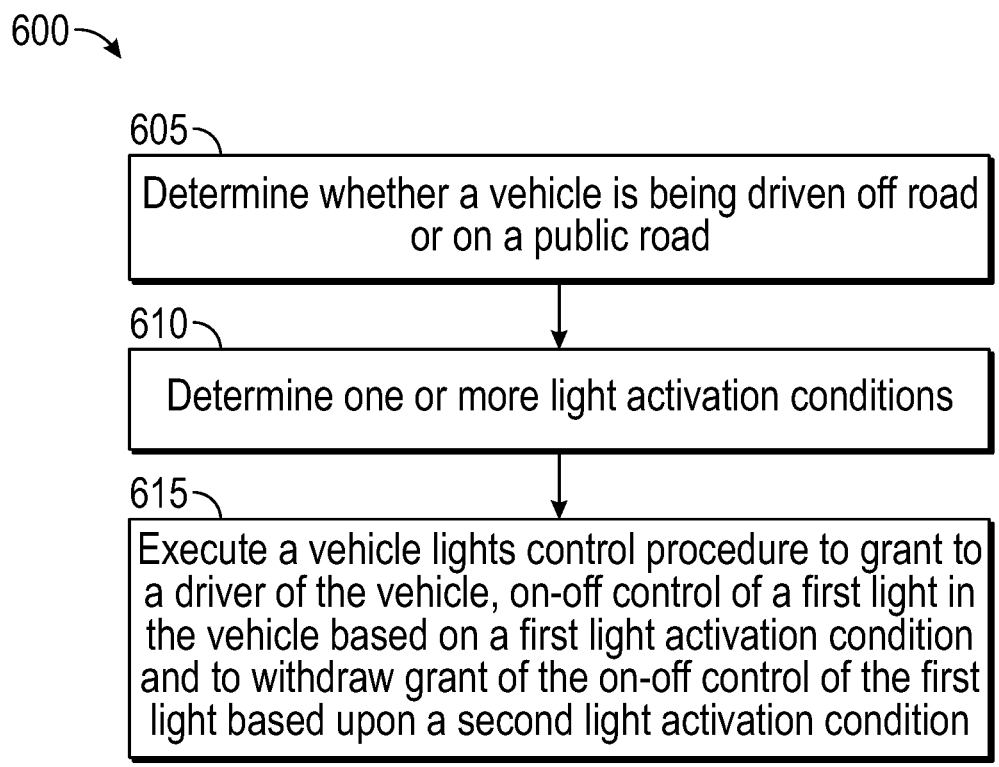
FIG. 6 shows a flowchart of an exemplary method for automatically controlling various lights of a vehicle in accordance with the disclosure.

FIG. 6 shows a flowchart 600 of an exemplary method for automatically controlling various accessory lights of the vehicle 100 in accordance with the disclosure. The flowchart 600 illustrates a sequence of operations that can be implemented in hardware, software, or a combination thereof. In the context of software, the operations represent computer-executable instructions stored on one or more non-transitory computer-readable media such as the memory 307, which, when executed by one or more processors such as the processor 306, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. Some or all of the operations described in the flowchart 600 may be carried out by using the vehicle lights controller 305. The description below may make reference to certain components and objects shown in FIGS. 1-4, but it should be understood that this is done for purposes of explaining certain aspects of the disclosure and that the description is equally applicable to many other embodiments.

At block 605, a computer, such as the vehicle lights controller 305, may determine whether the vehicle 100 is being driven off-road or on a public road. The vehicle lights controller 305 may use the vehicle sensor system 405 and/or the image capture system 425 to determine at any given instant in time, or over a period of time, whether the vehicle 100 is being driven on the public road 515 or off-road along the path 520.

At block 610, the vehicle lights controller 305 may determine one or more light activation conditions. The light activation conditions may be dependent upon various factors such as whether the vehicle 100 is being driven on a public road or off-road. For example, a first set of light activation conditions may be applicable when the vehicle 100 is being driven on the public road 515. The first set of light activation conditions may be stored in the database 313 and/or may be fetched from a server computer. The vehicle lights controller 305 may wirelessly communicate with the server computer for obtaining the light activation conditions from the server computer.

In another example, a second set of light activation conditions may be applicable when the vehicle 100 is being driven at a location that is identifiable by GPS coordinates, irrespective of the nature of the terrain upon which the vehicle 100 is being driven. The second set of light activation conditions may be stored in the database 313 and/or may be fetched from a server computer. The vehicle lights controller 305 may wirelessly communicate with the server computer for obtaining from the server computer, light activation conditions applicable to the GPS coordinates. In one exemplary case, the light activation conditions may be time-based, and the GPS coordinates may be used to determine a time at which the sun sets at a particular location. As is known, darkness sets in at different times at different locations in a geographical area and this aspect may be used to identify the second set of light activation conditions.

At block 615, the vehicle lights controller 305 may execute a vehicle lights control procedure to grant to a driver of the vehicle, on-off control of a light in the vehicle 100 based on a first light activation condition and to withdraw grant of the on-off control of the light based upon a second light activation condition. For example, as described above with respect to FIG. 4, the vehicle lights controller 305 may grant to a driver of the vehicle 100, on-off control of the undercarriage light 130a and the undercarriage light 130b of the vehicle 100 because it is permissible to do so under county law but may deny on-off control of the headlights of the vehicle 100 in accordance with federal law. The federal law may, for example, stipulate that the headlights of the vehicle 100 should remain on at all times irrespective of the nature of the road (off-road or public road) upon which the vehicle 100 is being driven.

Granting of an on-off control of a light of the vehicle 100 may be carried out by enabling operability of the light. This may be done by permitting the driver to manually operate a switch (such as the switch 412 shown in FIG. 4). Denying on-off control of the switch may involve disabling the light by use of a control signal propagated via the bus 440.

The flowchart 600 may include various additional steps such as placing a limitation upon an intensity of light emitted by one or more lights of the vehicle 100.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 307, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example, but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including vehicle computers, human-machine-interface (HMI) systems, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application-specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not in function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
determining, by a vehicle computer, whether a vehicle is being driven off-road or on a public road;
determining, by the vehicle computer, a first light activation condition that is based at least in part on whether the vehicle is being driven off-road or on the public road; and
executing, by the vehicle computer, a vehicle lights control procedure to grant a driver of the vehicle on-off control of a first light in the vehicle based on the first light activation condition and to withdraw grant of the on-off control of the first light based at least in part on a second light activation condition.

2. The method of claim 1, wherein the vehicle lights control procedure further comprises:
granting on-off control of a second light in the vehicle to the driver of the vehicle based on the second light activation condition.

3. The method of claim 1, wherein the first light is an accessory light mounted on the vehicle.

4. The method of claim 1, wherein the first light activation condition is further based on a set of rules applicable to vehicles driven on the public road.

5. The method of claim 4, wherein the set of rules is defined by at least one of a standards body, a government agency, or a law-enforcement agency.

6. The method of claim 4, wherein withdrawing the grant of the on-off control of the first light is based on a first rule in the set of rules that prohibits use of the first light when the vehicle is being driven on the public road.

7. The method of claim 1, wherein withdrawing grant of the on-off control of the first light comprises disabling, by the vehicle computer, a switch that is coupled to the first light.

8. A method comprising:
- determining, by a vehicle computer, whether a vehicle is being driven off-road or on a public road;
- enabling, by the vehicle computer, an operability of a first light in the vehicle based at least in part on whether the vehicle is being driven off-road or on the public road; and
- disabling, by the vehicle computer, an operability of a second light in the vehicle based at least in part on whether the vehicle is being driven off-road or on the public road.

9. The method of claim 8, wherein enabling the operability of the first light in the vehicle comprises enabling a first switch that is coupled to the first light, and wherein disabling the operability of the second light in the vehicle comprises disabling a second switch that is coupled to the second light.

10. The method of claim 8, further comprising:
- accessing, by the vehicle computer, a database containing a set of rules that define conditions-of-use of at least one of the first light in the vehicle or the second light in the vehicle; and
- determining, by the vehicle computer, based on the set of rules, that the first light is permitted for use by a driver of the vehicle when the vehicle is being driven off-road and is not permitted for use by the driver of the vehicle when the vehicle is being driven on the public road.

11. The method of claim 10, wherein the set of rules is defined by at least one of a standards body, a government agency, or a law-enforcement agency.

12. The method of claim 8, wherein determining whether the vehicle is being driven off-road or on the public road comprises processing at least one of a signal received from a gear shift system in the vehicle, a global positioning system (GPS) system, or an image captured by an imaging system in the vehicle.

13. The method of claim 8, wherein enabling the operability of the first light in the vehicle comprises granting, over a first duration of time, on-off control of the first light by a driver of the vehicle, and wherein disabling the operability of the second light in the vehicle comprises withdrawing, over a second duration of time, on-off control of the second light by the driver of the vehicle.

14. The method of claim 8, wherein at least one of the first light or the second light includes a light emitting diode.

15. A computer system comprising:
- a non-transitory memory that stores computer-executable instructions; and
- a processor configured to access the non-transitory memory and execute the computer-executable instructions to at least:
  - determine whether a vehicle is being driven off-road or on a public road;
  - determine a first light activation condition that is based at least in part on whether the vehicle is being driven off-road or on the public road; and
  - execute a vehicle lights control procedure to grant to a driver of the vehicle, on-off control of a first light in the vehicle based on the first light activation condition and to withdraw grant of the on-off control of the first light based at least in part on a second light activation condition.

16. The computer system of claim 15, wherein the processor is further configured to access the non-transitory memory and execute additional computer-executable instructions to at least:
- grant on-off control of a second light in the vehicle to the driver of the vehicle based on the second light activation condition.

17. The computer system of claim 16, wherein determining whether the vehicle is being off-road or on the public road comprises the processor processing a signal received from at least one of a global position system (GPS) system, an imaging system, or a sensor located in the vehicle.

18. The computer system of claim 17, wherein the first light activation condition is further based on a set of rules applicable to vehicles driven on the public road.

19. The computer system of claim 18, wherein the set of rules is defined by at least one of a standards body, a government agency, or a law-enforcement agency.

20. The computer system of claim 15, wherein the first light is an accessory light, and wherein withdrawing grant of the on-off control of the accessory light comprises disabling a switch that is coupled to the accessory light.

* * * * *